Figure 1:
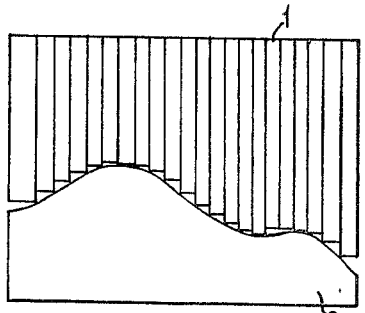

Sept. 6, 1966   D. C. BROWN ETAL   3,271,281
METHOD OF MAKING A TOOL FOR ELECTROCHEMICAL MACHINING
Filed March 8, 1962   3 Sheets-Sheet 1

Inventor
D.C. BROWN
E.W. DICKSON
By
Holcombe, Wetherill & Brisebois
Attorneys

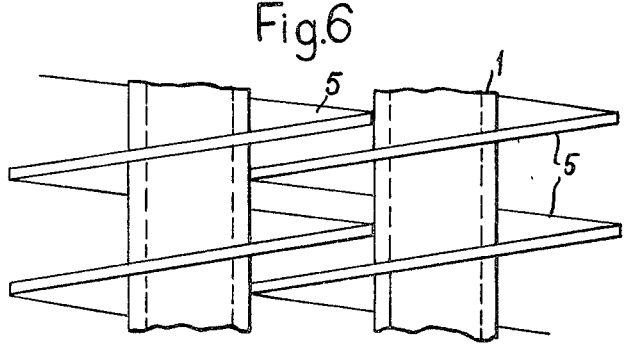
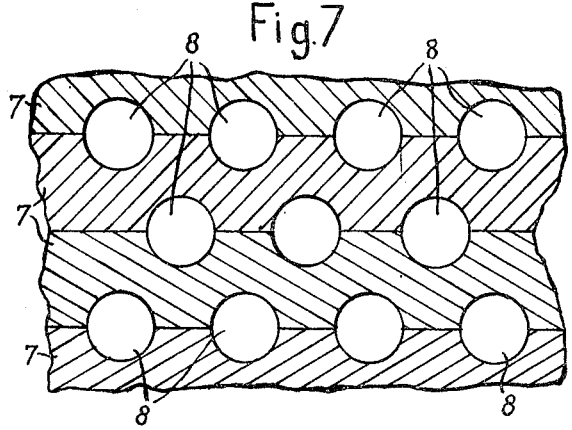
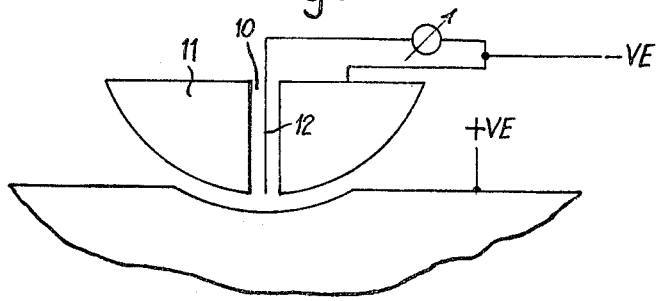

United States Patent Office 3,271,281
Patented Sept. 6, 1966

3,271,281
METHOD OF MAKING A TOOL FOR ELECTROCHEMICAL MACHINING
Dennis Cockburn Brown and Eric Winston Dickson, Warwickshire, England, assignors to Associated Engineering Limited, Leamington Spa, Warwickshire, England, a British company
Filed Mar. 8, 1962, Ser. No. 178,418
Claims priority, application Great Britain, Mar. 8, 1961, 8,492/61
10 Claims. (Cl. 204—143)

The present invention relates to electrochemical machining in which metal is electrolytically removed from the workpiece by passing a direct current through an electrolyte between a tool forming the negative electrode and the workpiece forming the positive electrode. Descriptions of this process have appeared in the November 1959 issue of "Carbide Engineer" and the December 1959 issue of "Machinery."

The present invention has for an object to provide an improved tool for enabling cavities, particularly cavities of complex shape, to be produced by electrochemical machining.

The method according to this invention of making a tool for electrochemical machining of complex cavities consists in assembling a plurality of rods, tubes, sheets, plates or other components in a bundle, stack or the like with their ends engaged by a die having the shape of the complex surface to be formed so that the ends of the rods, tubes or other components are positioned to conform with this shape, and then securing the said components of the assembly together. In order that the end of the assembly may conform substantially exactly with the configuration of the master die, the end of the assembly is electrochemically machined by using the die as the cathode and the assembly of rods, tubes or other components as the anode.

Passages for the supply and/or exhaust of electrolyte to and from the workface of the tool may be formed by passages in or between the components from which the tool is assembled.

In one embodiment, the tool according to this invention comprises a bundle of tubes of conducting material assembled together so that the ends of the tubes at one end of the bundle define a workface conforming with the shape of the cavity to be machined, means being provided for conveying electrolyte to the workface through at least some of the tubes.

The electrolyte may be pumped down the tubes to the workface and may be exhausted, together with the waste products removed from the workpiece, by the machining, through the gap between the workface and the workpiece. According to a feature of the invention, the electrolyte is also exhausted through at least some of the tubes extending from the workface of the tool. Preferably, the passages through which the electrolyte is fed to and exhausted from the gap between the workface and the workpiece are closely adjacent each other, and inlet and exhaust passages may be distributed in interspersed array over the workface. For example some of the tubes forming the tool may be used for the supply of electrolyte to the gap and others for exhausting the electrolyte. In another embodiment at least some of the tubes forming the tool may have further tubes arranged, for example concentrically, therein, the electrolyte being supplied through the central tube and exhausted through the space between a pair of tubes or vice versa.

It is preferable to arrange the electrolyte supply to each tube or other component via a hydraulic impedance, so that the pressure drop along each tube or other component is always very much greater than any change in back pressure which might be experienced in the machining operation. This means that sufficient electrolyte is always available at all parts of the working surface.

Another object of the invention is to provide means for maintaining the gap substantially constant when machining with tools of which the bottom is curved or of complex shape. According to this feature of the invention, the tool is provided with a hole at the part of the workface thereof which first comes into "contact" with the workpiece, and into this hole a probe is inserted which is connected to a source of direct current, the other pole of which is connected to the workpiece forming the anode, and means are provided for advancing the tool towards the workpiece so as to maintain the current flowing in the probe at a substantially constant predetermined value. Alternatively, the tool can be advanced at a substantially constant rate towards the workpiece whilst maintaining the supply voltage and electrolyte temperature substantially constant.

Figure 2:
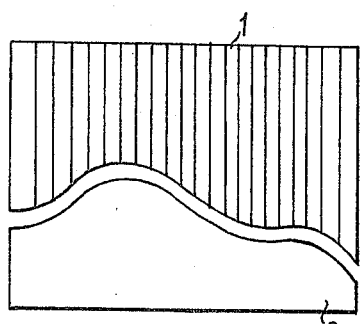
Figure 3:
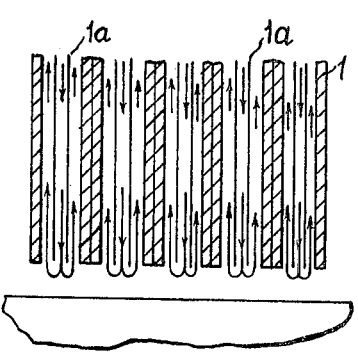
Figure 4:
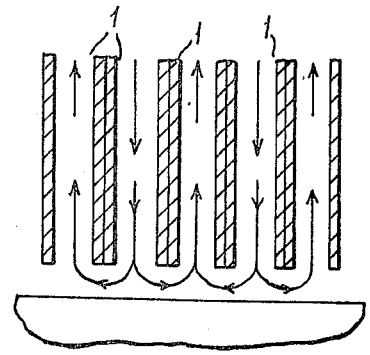
Figure 5:
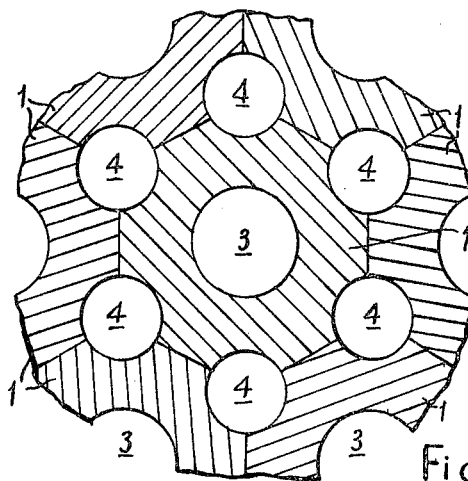
Figure 9:
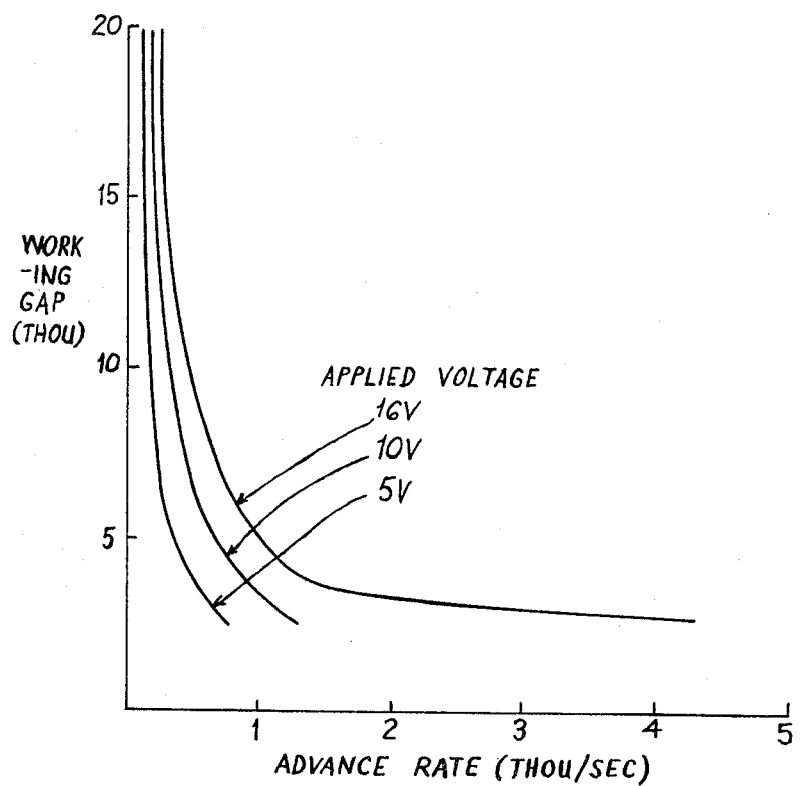

In order that the invention may be more clearly understood, reference will now be made to the accompanying drawings, in which:

FIGURE 1 is a diagrammatic side view illustrating the method of assembly of a tool having a complex surface, FIGURE 2 is a similar view after removing irregularities on the tube ends, FIGURES 3 and 4 are explanatory diagrams, FIGURES 5 to 7 show constructional details of various embodiments, FIGURE 8 is a diagram illustrating the method of maintaining the electrode gap constant, and FIGURE 9 is an explanatory graph.

Referring to FIGURE 1 of the drawings, the tool for electrochemically machining cavities of complex shape is assembled from a bundle of metal tubes 1. The ends of the tubes are rested on a master die 2, which may be a lead casting, so that the ends of the tubes generally conform to the surface of the die conforming to the shape of the complex cavity to be formed in a workpiece. The tubes of the bundle are then secured together in any convenient manner, for example by soldering, so as to maintain its shape. In order to remove the step-wise configuration of the tube ends and make it conform more closely to the surface of the master die, the bundle of tubes is then separated by a short distance from the master die, electrolyte is pumped down the tubes, and a D.C. voltage is applied across the gap so that the bundle of the tubes constitutes the anode. The end of the tube assembly will thereby be rapidly electrochemically machined to a shape which will result in a uniform current density at the face of the workpiece during the machining operation.

The resulting tube assembly is then used as the cathode in the process of electrochemically machining the workpiece. The tube assembly may be mounted in a holder so that electrolyte may be pumped down the tubes and out through the gap between the workface of the tool and the workpiece. Alternatively, at least some of the tubes may comprise pairs of concentric tubes 1, 1a as shown in FIGURE 3; the electrolyte may then be fed to the gap through the central tubes 1a and exhausted through the space between a pair of tubes 1, 1a or vice versa. In another modification, as shown in FIGURE 4, the tubes 1 may be simple, the electrolyte being supplied and exhausted through alternate adjacent tubes.

In a further modification as shown in FIGURE 5, the tubes 1 having bores 3 may be of generally polygonal, for example hexagonal, external shape with their corners cut away to form grooves which, when a plurality of tubes are assembled together, form further passages 4 as shown. The passages 4 may serve for exhausting the electrolyte fed to the workface through the bores 3 or vice versa.

The tubes may alternatively be spaced apart to provide passages therebetween for electrolyte flow, for example as shown in FIGURE 6 in which the tubes 1 are spaced apart by spiral fins 5 arranged therearound. Instead of providing the tubes with fins they may be held spaced apart by passing them through apertures in a plate and securing them to the plate, e.g., by soldering.

For some tool shapes the tool could be assembled from metal sheets or plates. The abutting surfaces of the sheets may be formed with grooves or channels for the circulation of the electrolyte. FIGURE 7 shows an end view of such an assembly of sheets 7 formed with grooves 8 along the surfaces thereof which, when the sheets are laminated together, form passages for feeding electrolyte to and/or from the workface.

In electrochemical machining it is important that the gap between the tool and the workpiece should be maintained constant. This gives rise to difficulties when producing a cavity which does not have a flat bottom, such as a hemispherical cavity or a complex cavity. Provided that the gap and the supply temperature of the electrolyte is maintained substantially constant, and the voltage regulation of the D.C. generator is substantially perfect, the current density at that part of the tool electrode which first comes into "contact" with the workpiece will remain constant. A feature of this invention consists in monitoring the current density in this region and controlling the feed rate of the tool into the anode so as to maintain this current density, and thus the gap width, substantially constant. This may be achieved as shown in FIGURE 8 by providing a hole 10 in the tool 11 which opens into the workface thereof at a point which first comes into "contact" with the workpiece, and positioning in the hole a probe 12 which is connected to the D.C. supply feeding the two electrodes. The current flowing in the probe is proportional to the gap width, and having determined a particular value for the gap width the current flowing in the probe is used as a reference current in order to control the rate of advancement of the tool into the anode. If the tool is constructed of a tube assembly as described, the probe may be arranged in the bore of one of the tubes.

A simpler and more accurate means of controlling the gap between the tool and the workpiece is to maintain the advance rate, supply voltage and electrolyte temperature substantially constant throughout the machining operation and this will automatically result in a constant gap being maintained. The graph of FIGURE 9 shows how, by fixing the voltage and advance rate, the working gap is determined (for a particular electrolyte constitution, temperature, and workpiece material).

The superiority of this system compared with servo system of gap control is evident because the very nature of feedback control, relying as it does on an unbalance in order to correct itself, will result in hunting and variation in the advance rate. This variation in the advance rate is particularly serious at the low advance rates, which are common in cavity sinking, as can be seen from the graph.

It is desirable in electrochemical machining to keep the waste products in solution; this not only keeps the exhaust passages clear but means that the electrolyte can be recirculated without resorting to large filtration systems. Filtration is still necessary, however, to remove particles which might obstruct the feed or exhaust tubes, but the problem is minimised. In a typical example the electrolyte used in machining the metal alloy known as "Nimonic 115" (approximate composition Cr 15%, Al 5%, Mo 5%, Co 20%, Ni 55%) consisted of 200 gms. of sodium chloride plus 10 mls. of hydrochloric acid to each litre of water. This electrolyte composition was satisfactory in maintaining the waste products in solution. The presence of the acid did not, however, alter the machining efficiency of the electrochemical process.

In a further example, an electrode configuration, similar to that shown in FIGURE 6 was fabricated of stainless steel tubes in a close packed hexagonal array, the dimensions of each of the tubes being 0.116 inch overall diameter and 0.080 inch internal diameter. Each tube had a hydraulic impedance built into it so that a pressure drop of 30 p.s.i. resulted when the desired electrolyte flow of 1.5 cc./second passed through it. The spacing between tube centres was 0.141 inch so that electrolyte could exhaust between the tubes. Using an advance rate of 0.00025 inch/second, an applied voltage of 16 volts and an electrolyte consisting of 200 gms./liter of sodium chloride, the shape of the master die was reproduced in a typical die steel with a surface roughness of ±0.0013 inch due to the small asperities inevitably present when reverse machining is not employed. The current density employed in this case was about 120 amps./in.$^2$ and the electrochemical efficiency about 85%.

When using tubes or components with passages therethrough to form the electrode, small asperities are left on the machine surface of which the height depends on the electrode gap and diameter of the tubes or passages. In order to remove or reduce these asperities and thus improve the surface finish, the electrode may be moved further away from the workpiece to increase the gap or it may be replaced by a solid electrode or by another multi-tube or multi-passage electrode constructed with tubes or passages of a different diameter or with a different spacing. The asperities can also be removed by employing reverse machining, as described with reference to FIGURE 2, provided that the working conditions are arranged so that the working gap is substantially the same during the normal machining operation as in the reverse machining operation.

While particular embodiments have been described, it will be understood that various modifications may be made without departing from the scope of the invention. Thus the tool may be constructed from an assembly of solid pins or other components so as to provide an array of channels, preferably substantially uniformly distributed, for the supply and/or exhaust of electrolyte. The ends of the pins or other components may be electrochemically machined to conform with the master die as explained with reference to FIGURE 2.

We claim:
1. The method of making a tool for the electrochemical machining of complex cavities which consists in bringing a plurality of electrically conductive components together in parallel relationship so that each of said components has one end engaged by a die having the shape of a complex surface to be formed, whereby said ends of said components are positioned to conform to this shape, and securing the said components together.

2. The method as claimed in claim 1, in which said plurality of components are tubes.

3. The method as calimed in claim 2, in which each of said tubes comprises two concentric passageways for the flow of electrolyte.

4. The method as claimed in claim 1, in which said plurality of components are provided with grooves which, when the components are assembled together, define passageways for electrolyte flow.

5. The method as claimed in claim 1, in which said plurality of components comprise plates.

6. The method as claimed in claim 5, in which said plates are provided with grooves which, when the plates are assembled together, define passageways for electrolyte flow.

7. The method as claimed in claim 1, in which said components are provided with spacers to hold them spaced apart to provide passages therebetween for electrolyte flow.

8. The method of making a tool for the electrochemical machining of complex cavities which consists in assembling a plurality of components together in parallel relationship so that each of said components has one end engaged by an electrically conducting die having the shape of a complex surface to be formed, whereby said ends of said components are positioned to conform to this shape, securing the said components together, and subsequently electrochemically mechining said ends of said components by using the die as a cathode and said components as an anode to cause said ends of said components to conform substantially exactly with the configuration of the die.

9. The method of making a tool for the electrochemical machining of complex cavities which consists in assembling a plurality of components together in parallel relationship so that each of said components has one end engaged by a die having the shape of a complex surface to be formed, whereby said ends of said components are positioned to conform to this shape, and so as to define passages for the flow of electrolyte through the tool, and securing the said components together.

10. The method of making a tool for the electrochemical machining of complex cavities which consists in assembling a plurality of components together in parallel relationship so that each of said components has one end engaged by an electrically conducting die having the shape of a complex surface to be formed, whereby said ends of said components are positioned to conform to this shape, and so as to define passages for the flow of electrolyte through the tool, securing the said components together, and subsequently electrochemically machining said ends of said components by using the die as a cathode and said components as an anode to cause said ends of said components to conform substantially exactly with the configuration of the die.

References Cited by the Examiner

UNITED STATES PATENTS

| 3,019,178 | 1/1962 | Williams | 204—143 |
| 3,041,265 | 6/1962 | Williams | 204—224 |
| 3,058,895 | 10/1962 | Williams | 204—143 |

JOHN H. MACK, *Primary Examiner.*

D. R. JORDAN, *Assistant Examiner.*